Aug. 9, 1949.                J. CULIK                2,478,249

METHOD OF MAKING ARMPIT SHIELDS

Filed Feb. 1, 1946

INVENTOR.
Jiri Culik
BY *Heinrich Hochschild*
ATTORNEY

Patented Aug. 9, 1949

2,478,249

UNITED STATES PATENT OFFICE 2,478,249

METHOD OF MAKING ARMPIT SHIELDS

Jiri Culik, Prague XVI, Czechoslovakia

Application February 1, 1946, Serial No. 644,953
In Czechoslovakia July 18, 1945

3 Claims. (Cl. 18—58.7)

The invention is concerned with a method of making from a vulcanizable gum, such as rubber, caoutchouc, latex or the like, armpit shields composed of two leaves of crescent shape joined at their concave edges.

An object of the invention is the making of such two-leaved armpit shields the two leaves of which are integrally joined together with their concave edges at the moment of production and without any additional work being necessitated. No protruding, re-enforced, stiffened seam which might inconvenience the wearer will therefore be noticeable at the finished armpit shield.

A further object of the invention is the simultaneous production of such two-leaved armpit shields as a coherent series from which the individual shields may be separated, without waste, by cutting along the common convex edges of each two successive or adjoining shields.

It is thus an object of the invention to manufacture in a highly economic way, as regards time and cost, two-leaved armpit shields of crescent shape, seamless at the common concave edge of the two leaves of which the armpit shield is composed and with clean-cut convex edges of both leaves.

In accordance with the invention, the method of making, from a vulcanizable gum, such as caoutchouc, rubber, latex or the like, two-leaved armpit shields of crescent shape comprises building up by dipmolding a series of successive armpit shields with vaulted leaves in the form of a skin, coating or shell of the gum through deposition of the gum from the outer faces of the double-leaved shields inwards, with the concave joining edge of the shield as a re-entering edge at the deposition, the shell being shaped so as to constitute a series of said armpit shields cohering at convex edges common to each two successive or adjacent shields of the series, vulcanizing the skin, coating, or shell, and separating the individual two-leaved armpit shields by cutting said skin, coating, or shell along said common convex edges, whereby, without waste, individual two-leaved armpit shields of crescent shape are produced with the two leaves of the shield integrally joined at the concave edges thereof.

More specifically, through the dip-molding a circumferentially closed shell of gum is produced the surface of which constitutes a series of two-leaved armpit shields of crescent shape joined at convex edges common to each two successive armpit shields. After vulcanizing, the individual two-leaved armpit shields of crescent shape will be separated from the series by cutting along said common convex edges.

In the embodiment of the invention specifically described hereinafter, a spheric star-ribbed shell of gum is produced by dip-molding, the opposing faces of each two successive star-ribs of the shell each constituting a two-leaved armpit shield of crescent shape. Successive or adjacent armpit shields are integrally joined together at the radiating edges of the star-ribs whereas the leaves of each armpit shield are integrally joined at the intermediate inverted edges of each two successive star-ribs. After vulcanization, the individual armpit shields are separated by cutting the shell at the radiating edges of the star-ribs.

The dip-mold for the method of the invention accordingly comprises a series of part-molds each for a two-leaved armpit shield of crescent shape, the part-molds being composed to a spheric star-ribbed body; the opposing faces of each two successive star-ribs of the body thus constituting each one of said part-molds.

For facilitating the cutting operation and guiding the cutting instrument, knife, each star-rib is provided at its projecting edge with a guide groove for said instrument.

The nature of my invention will now be more fully described with reference to the accompanying drawings which form part of this specification and which by way of example illustrate an embodiment of the invention.

It will be readily understood that the drawings are intended to be illustrative of the invention and not limitative of its scope; and that the invention may be embodied in other forms without departing from the principle underlying my invention and from the ambit of my appended claims.

Figure 1:
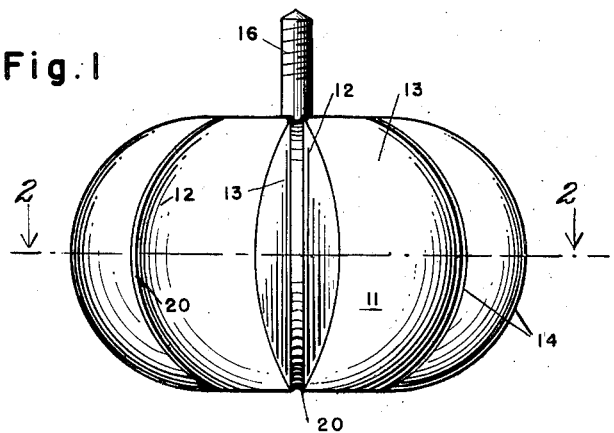
Fig. 1 is an elevational view of a spheric star-shaped dip-mold.

The dip-mold generally designated by 11 is a spheric star-ribbed body composed of an arbitrary number of, in the instance shown eight, star-ribs 14. The opposing faces 12, 13, of each two successive star-ribs 14 constitute each a mold for one two-leaved armpit shield of crescent shape.

The radiating edges 19 of the ribs are shaped to correspond to the convex edge or contour 21 of the armpit shield of crescent shape, whereas the intermediate inverted edges 22 of each two successive ribs are shaped so as to correspond to the concave edge or contour 23 of the armpit shield.

The mold is preferably made of metal or may also be made of wood, glass, porcelain, or other appropriate material. It may be made of one piece or be composed of several pieces, corresponding, for instance, to the individual star-ribs 14.

The top of the spheric star-shaped body 11 is provided with any convenient or conventional means, a screw bolt 16, for instance, for securing the mold to a conventional dipping frame or other dipping means (not shown).

For the making of the armpit shield, the mold 11 is dipped into an appropriate gum solution, dispersion, or the like, which is appropriately colored and has admixed therewith a vulcanizing agent, and, if desired, other agents, such as accelerators, retarders, conventional in the art of dip-molding articles from vulcanizable gums.

Figure 2:
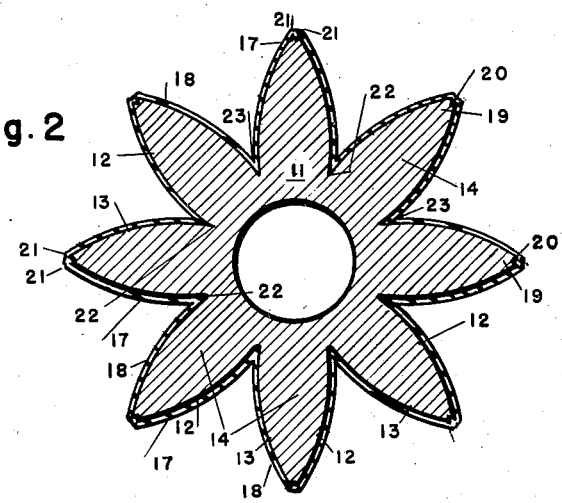
Fig. 2 is a cross-section, along line 2—2 of Fig. 1, of the mold with a gum coating or shell.

The gum adheres to the form as a thin layer, coating, skin, or shell, as indicated in exaggerated thickness in Fig. 2, at 17, 18, the numerals indicating the two leaves forming together an armpit shield.

The mold is now placed into the vulcanizing apparatus.

After termination of the vulcanization, the individual armpit shields are separated from one another by cutting along the grooves 20 with which the projecting edges of the star-ribs are provided for guiding the cutting edge of a knife or other cutting instrument.

Figure 3:
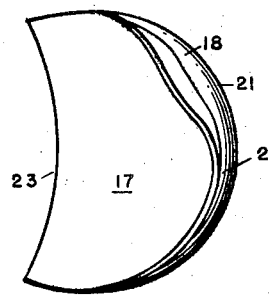
Fig. 3 is a top view of a finished two-leaved armpit shield of crescent shape, slightly opened to show the two leaves.

Two-leaved armpit shields 17, 18 of crescent shape, such as illustrated in Fig. 3, are thus obtained. The leaves of the armpit shield are, without any seam, integrally joined at their concave edges 23 and show clean convex edges 21. Moreover, these armpit shields, produced in accordance with the method of the invention and with the mold as hereinbefore described, are obtained without any waste of the gum material deposited on the mold by the dipping operation.

I claim:

1. The method of making from a vulcanizable gum armpit shields consisting of a pair of crescent-shped leaves integrally joined at a common concave edge which comprises building up by dipmolding a series of successive armpit shields with vaulted leaves through deposition of a shell of said gum from the outer faces of said double-leaved shields inwards with the leaves of each double-leaved shield cohering at said common concave edge, and the leaves of each two successive shields cohering at a common convex edge forming the outer contours of said shields and with said common concave edges as re-entering edges and said common convex edges as projecting edges at said deposition; vulcanizing said shell, and separating the individual armpit shields from said series by cutting said shell along said common convex edges, thereby to produce without waste individual two-leaved armpit shields of crescent-shape with the leaves of the shield integrally joined together at the concave edge thereof.

2. The method of making from a vulcanizable gum armpit shields consisting of a pair of crescent-shaped leaves integrally joined at a common edge which comprises building up by dipmolding a circumferentially closed shell constituting a series of successive armpit shields with vaulted leaves through deposition from the outer faces of said double-leaved shields inwards and with the leaves of each double-leaved shield cohering at said common concave edge and the leaves of each two successive leaves cohering at a common convex edge forming the outer contours of said shields and with said common concave edges as re-entering edges and said common convex edges as projecting edges at said deposition; vulcanizing said shell, and separating the individual armpit shields by cutting said circumferentially closed series along said projecting, common convex edges, thereby to produce without waste individual two-leaved armpit shields of crescent-shape with the leaves of the shield integrally joined together at the concave edge thereof.

3. The method of making from a vulcanizable gum armpit shields consisting of a pair of crescent-shaped leaves integrally joined at the common concave edge which comprises building up by dipmolding a spheric star-ribbed shell constituting a series of shields with vaulted armpit leaves through deposition of said gum from the outer faces of said double-leaved shields, and with the leaves of each double-leaved shield cohering at said common concave edge, and the leaves of each two successive shields cohering at a common convex edge forming the outer contours of said shields, and with said common concave edges as re-entering edges of each two successive star-ribs, and with said common convex edges as the projecting edges of said spheric star-ribbed shell at said deposition; vulcanizing said spheric star-ribbed shell, and separating the individual armpit shields by cutting along said projecting edges; thereby to produce without waste individual two-leaved armpit shields of crescent-shape with the leaves of the shield integrally joined together at the concave edge thereof.

JIRI CULIK.

REFERENCES CITED

The following references are of record in the file of this patent:

UNITED STATES PATENTS

| Number | Name | Date |
|---|---|---|
| 2,130,921 | Hansen | Sept. 20, 1939 |
| 2,173,343 | Spanel | Sept. 19, 1939 |
| 2,216,985 | Rice | Oct. 8, 1940 |
| 2,221,135 | Hansen | Nov. 12, 1940 |
| 2,236,306 | Bratring | Mar. 25, 1941 |
| 2,313,792 | Winder | Mar. 16, 1943 |